Nov. 27, 1928.
A. H. JESSEN
1,693,080
AUTOMATIC GEAR SHIFT
Filed March 27, 1926
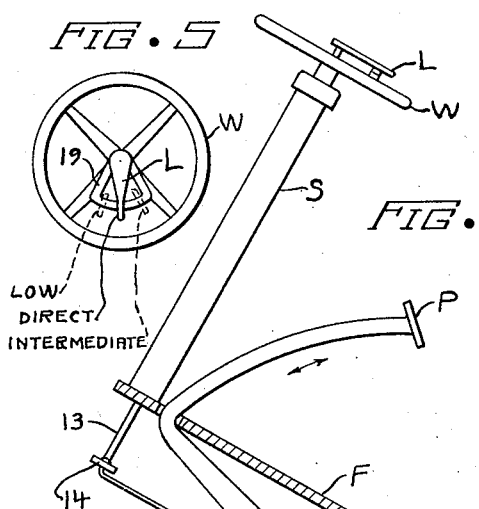
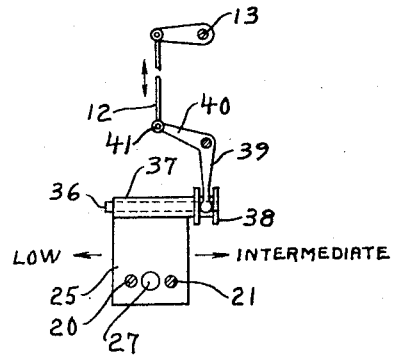
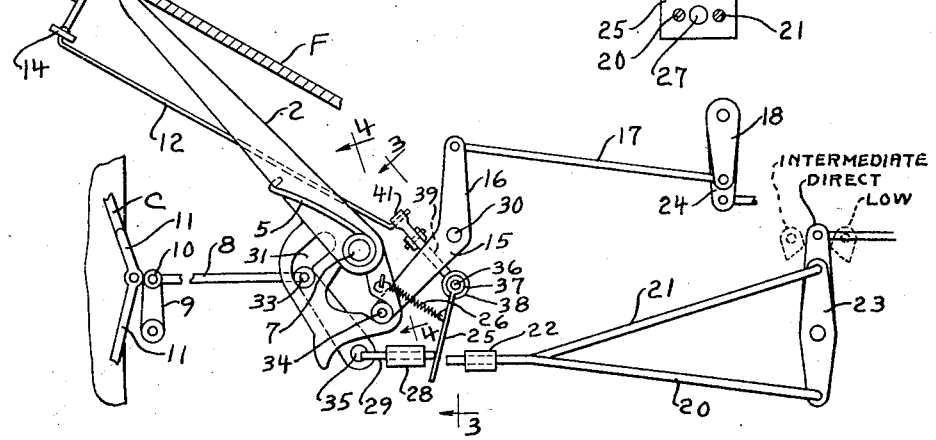
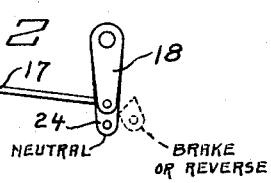
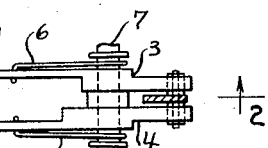
*INVENTOR.*
A. H. JESSEN
BY
*ATTORNEY.*

Patented Nov. 27, 1928.

1,693,080

UNITED STATES PATENT OFFICE.

ARNOLD H. JESSEN, OF LOS ANGELES, CALIFORNIA.

AUTOMATIC GEAR SHIFT.

Application filed March 27, 1926. Serial No. 97,868

My invention relates to an apparatus for shifting gears, and more particularly to a gear shifting apparatus for the transmission mechanism of a motor or other vehicle, although in its broader aspects it is by no means to be limited to such.

It accordingly is an object of my invention to provide a novel form of gear shifting apparatus having a selective speed control mechanism, preferably equipped with a lever whereby said mechanism may be set for different speeds, there being sets of selective gear clutch appliances associated with said apparatus for causing a transmission mechanism to be operated at selective speeds, a clutch being also associated with the apparatus, which clutch may be engaged or disengaged as required by a set of operating devices in the shape of pedals or levers so that the proper speeds may be obtained, provision being also made for a reverse movement of said transmission mechanism, and also for brake application.

It is also within the province of my invention to utilize my novel form of apparatus in connection with the transmission mechanism disclosed in my pending application for a transmission Ser. #69,140 filed Nov. 14, 1925, as well as that for a transmission Ser. #100,550, filed April 8, 1926, although it is possible to utilize said apparatus with known transmission mechanisms, and those now on the market, certain portions of said apparatus, if desired, being omitted.

A further object of my invention is to provide a novel form of apparatus which is easy and inexpensive to manufacture, composed of a minimum number of parts, not easy to get out of order, thoroughly reliable and effective in operation, and one which will effectively produce the objects intended.

Further objects and advantages of my apparatus will become more apparent as the description thereof proceeds.

Reference is had to the accompanying drawings, in which similar reference characters denote similar parts. In the drawings, Fig. 1 is a more or less fragmentary elevational view of my apparatus, Fig. 2 is a fragmentary cross-sectional view on the line 2—2, Fig. 4, Fig. 3 is a front elevational view of the transmission control rod appliance, Fig. 4 is a fragmentary top plan view of my invention, and Fig. 5 is a top plan view of the steering wheel having my selective speed setting device associated therewith.

Describing my invention more in detail, it is my object to provide a novel form of gear shifting apparatus which may be used in connection with any transmission mechanism now on the market by omitting certain parts, but is especially adapted for use in connection with my own especial construction, as disclosed in the application hereinbefore referred to.

As seen more particularly in Fig. 1, my novel apparatus is preferably associated with the steering column S of a motor vehicle, a rod or vertical member 13 being preferably though not necessarily, positioned therein, and adapted to be oscillated through the arc of a circumference by means of a selective speed lever L, which lever may be set so as to provide for different speeds of the transmission mechanism, in the present instance, low, intermediate, reverse, and direct drive are indicated. If desired suitable notches, labelled or not as preferred, may be associated with a quadrant or other device 19, associated with the steering wheel W.

The rod 13 is connected by any preferred means, such as the bent-over and cotter pin construction 14, with a link 12, which link is connected in any desired manner, as at 41, with the arm 40 of a bell crank lever, the other arm 39 of which is preferably formed, as depicted in Fig. 3 with a grooved collar or other device 38, either integral with or secured to the sleeve 37 in any manner desired. The purpose of this construction is to reciprocate the transmission control rod plate 25, associated in any preferred way with the sleeve 37, to such portions that either the upper transmission control rod 21 or the lower transmission control rod 20, or both simultaneously may be shifted to operate the oscillating lever 23, pivoted at any convenient point, to actuate the clutches associated with the transmission mechanism. None of these is shown since they are not the subject of the present invention. The rod 36, which may be bended to prevent the sleeve from slipping off is anchored in any desired manner to any part of the transmission casing, as well as the pivot of the bell crank lever.

A clutch C, shown only in fragmentary form since it is not the subject of the present invention, is preferably associated in any desired manner with the fly wheel of the engine. Said clutch has associated therewith a pair of arms 11, which arms are adapted to be moved inwardly and outwardly by the lever 9, roller 10, link 8, roller 33 and slot 31 construction depicted in Fig. 1, the pedal arm 2 associated in any preferred manner with the pedal P, being equipped with said slot.

The pedal P may be so positioned with relation to the floor boards F that it may be either partly depressed or entirely to close proximity with said floor boards, to provide for an operation of the apparatus presently to be described. A spring or resilient member 5, coiled about the shaft 7, on which the pedal arm 2 is mounted, and engaging said arm as shown, provides for resisting the movement of said pedal arm and consequently the pedal P. Of course, this arrangement is suggestive merely, and may in practice be changed to meet manufacturing contingencies.

The pedal arm 2 is also equipped with another slot, as depicted in Fig. 1, so shaped as to provide for a proper movement for the cam roller 34, associated with a mechanism presently to be described. Further, the pedal arm 2 is preferably so shaped as to lower portions to provide an engaging device to engage with the pin or reciprocating member 29, movable with the sleeve 28 associated in any preferred manner with the apparatus. An anchoring means of any preferred type for the spring 26, resisting the movement of the transmission control rod plate 25, is also provided on the arm 2, or its extension, at any convenient place.

As seen more particularly in Fig. 4, another rear pedal P', associated in any preferred manner with a pedal arm 1, is provided to operate a mechanism presently to be described, to provide for a reverse movement for the transmission mechanism and also a brake application in the manner to be described. The pedal arm 1 is also mounted on the shaft 7, associated in any preferred manner with the apparatus, and a spring 6, a duplicate of the spring 5, and associated with the arm 1 and the shaft 7, is provided for resisting the movement of the pedal P', and to bring said pedal to its original position after it has been depressed.

As seen more particularly in Fig. 2, the arm 1 is equipped with a cam slot 32 of any preferred and convenient shape to provide for a proper movement of a cam roller 34 associated in any desired way with the arm 15 of a bell crank, pivoted at 30 to a stationary part of the apparatus, the arm 16 having connected thereto a link 17 associated with a cone shifting fork lever 18, movable with the lever 24, which lever connects with the forks of the cones disclosed in the applications hereinbefore referred to. This construction, however, may be omitted when my apparatus is associated with a conventional or other form of transmission apparatus, the pedal P' in this case functioning solely to provide for brake application.

*Low gear.*

The selective speed lever L is oscillated on the quadrant 19 to the position indicated by the word, Low in Fig. 5. This movement turns the rod 13, and in turn operates the link 12, arms 40 and 39 of the bell crank (see Fig. 3), shifting the plate 25 through the sleeve 37, by means of the grooved collar 38 to the low position, as indicated by the left arrow in said figure. The hole 27 will now be in alignment with the lower rod 20, and no matter what position the rigidly connected lever 23 may be in, the depression of the pedal P will cause the rod 20 to enter the hole 27, the plate 25 engaging the upper rod 21, which shifts the lever 23 to the dotted position at the right in Fig. 1. This places the transmission mechanism in low gear. Depressing the pedal P causes the cam roller 33 to ride in the slot 31, pulling the link 8, and disengaging the clutch C. The projection on the lower portion of the pedal arm 2 comes in contact with the pin or reciprocating element 29 and forces it through the stationary sleeve 28 to engage the plate 25 in the movement just described.

*Intermediate.*

The lever L is shifted to the extreme right in Fig. 5. This positions the plate 25 so that the hole 27 is in alignment with the upper rod 21. The pedal P is then depressed, which releases the clutch C, through the action of the roller 33, and at the same time causes the roller 34 to ride in its slot to actuate the arms 15 and 16 of the bell crank (see Fig. 1), link 17, and levers 18 and 24 to set the cones of the transmission mechanism disclosed in the applications hereinbefore referred to, to provide for this speed, the plate 25 also moving the upper rod 21 and lever 23, as explained. Releasing the pedal, the apparatus instantly assumes the intermediate position for intermediate drive.

*Direct drive.*

With the lever L in central position, Fig. 5, the plate 25 is shifted so that the hole 27 will be positioned between the rods 20 and 21. (See Fig. 3.) Pressing on the pedal P, the clutch C is disengaged, and the rods 20 and 21 are both moved simultaneously, shifting the levers 23 and 18 to the full line position.

*Brake.*

Depressing both pedals simultaneously down to the boards F disengages the clutch C and causes the levers 18 and 23 to place the transmission mechanism to make brake application. Further, by depressing the pedal P, releasing the clutch C, brake application is made by depressing the pedal P'.

*Neutral.*

This is accomplished by merely depressing the pedal P part way, so that the clutch C and the transmission mechanism associated with the appliances, 16, 17, 18, and 24 are disengaged, allowing the motor to idle.

*Reverse.*

This is accomplished by placing the lever L in low position on the quadrant 19, since the low gear and reverse are accomplished in a similar manner, partly depressing the pedal P, to disengage the clutch C, and then depressing the pedal P'.

While I have thus described my invention with great particularity, it will be clear that the same may be modified throughout a wide range. I accordingly do not propose to be limited to the exact details of construction shown and described, but reserve the right in practice to make any and all modifications thereof that fall within the scope of the appended claims.

I claim as my invention:

1. In a gear shifting apparatus, in combination, a selective speed setting means, a depending endwise shiftable spring retarded swinging plate adapted to be shifted by said means, a set of pivoted means for operating selective speed change means, operating rods for said pivoted means, said rods being adapted to be directly operated by said plate to operate said pivoted means, and means for operating said sets of pivoted means when said speed setting means has been set.

2. In a gear shifting apparatus, in combination, a selective speed setting means, an oscillating gear shifting lever, a set of transmission control rods pivoted to said lever, a depending pivoted endwise shiftable transmission control rod setting plate, said plate being perforated to selectively render said rods operative or inoperative, said plate being adapted to be shifted by said setting means, means for operating said shiftable means for directly actuating said control rods, and a clutch operable by said last means.

3. In a gear shifting apparatus, in combination, a selective speed setting means whereby a transmission mechanism may be operable at different selective speeds, an oscillating gear shifting lever, a set of transmission control rods pivoted to said lever, a depending swinging spring retarded perforated plate shiftable by said setting means for setting said rods so that they may be operated, means for operating said plate to cause the latter to operate said rods, a clutch, and means connected to said clutch and to said last means for releasing said clutch so that said rods may be operated.

4. A gear shifting apparatus, a selective speed setting means, a set of transmission control rods for operating a transmission mechanism, a clutch, a perforated spring retarded plate pivotally suspended between said clutch and said rods, means connected to said setting means for shifting said plate for selectively operating one or more of said rods, or rendering one of said rods inoperative, means for swinging said plate to actuate said rods, and means connected to said clutch and said last mentioned means whereby said clutch may be engaged or disengaged, said clutch, when disengaged, providing idling position for said transmission mechanism.

5. In a gear shifting apparatus, in combination, a selective gear setting mechanism whereby a transmission mechanism provided with means for making brake application and a reverse movement may be set to operate at different selective speeds, a pivoted endwise shiftable plate adapted to be shifted by said setting mechanism, a set of transmission operating rods adapted to be operated by said plate, means for operating said plate to operate said rods when said plate is set, a clutch, means for engaging and disengaging said clutch, means for making said brake application when said clutch is disengaged, and means connected to said transmission mechanism and said clutch, whereby when said clutch is disengaged said reverse movement of said mechanism may be accomplished by operating said brake application means, or when said clutch is disengaged, idling position may be had for said transmission mechanism.

In testimony whereof I have signed my name to this specification.

ARNOLD H. JESSEN.